United States Patent [19]
Cramer

[11] 3,768,761
[45] Oct. 30, 1973

[54] INFLATABLE LIFE RAFT
[75] Inventor: Robert L. Cramer, Davenport, Iowa
[73] Assignee: The Bendix Corporation, South Bend, Ind.
[22] Filed: July 26, 1971
[21] Appl. No.: 165,990

[52] U.S. Cl................ 244/138 R, 9/11 A, 244/148
[51] Int. Cl............................................. B64d 17/00
[58] Field of Search..................... 244/138 R, 137 P, 244/148, 121, 141, 122 R; 9/11 A, 11 R, 311, 335, 2 R, 2 A, 2 C, 2 F, 2 S

[56] References Cited
UNITED STATES PATENTS
| 3,058,127 | 10/1962 | Nee Endras | 9/11 A |
| 3,107,370 | 10/1963 | Gaylord | 9/11 R |
| 2,363,249 | 11/1944 | Hutchinson | 244/121 |
| 3,125,770 | 3/1964 | Reffell | 9/11 A |

FOREIGN PATENTS OR APPLICATIONS
| 812,771 | 4/1959 | Great Britain | 9/11 A |

Primary Examiner—Duane A. Reger
Assistant Examiner—Jesus D. Sotelo
Attorney—Gordon H. Chenez et al.

[57] ABSTRACT

An inflatable life raft for aircraft crew member survival normally contained in a deflated state in a container attached to a parachute harness and provided with compartments adapted to be automatically inflated in a predetermined sequence by a pressurized gas during a parachute descent over land or water to enclose the parachutist and protect the same from adverse environmental conditions including water immersion upon touchdown.

2 Claims, 12 Drawing Figures

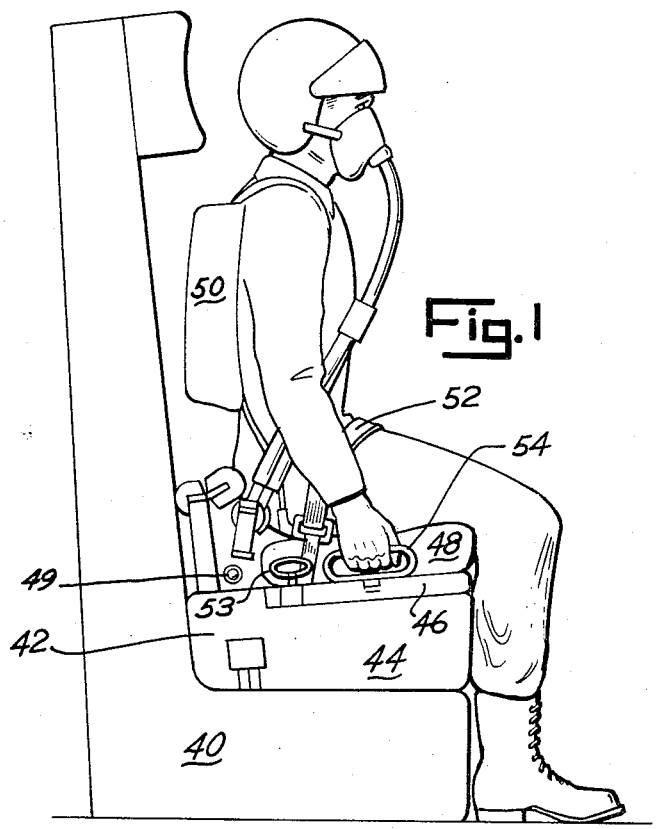
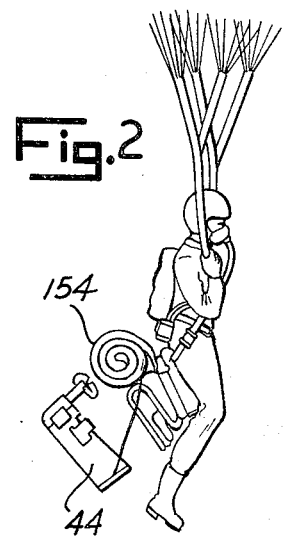
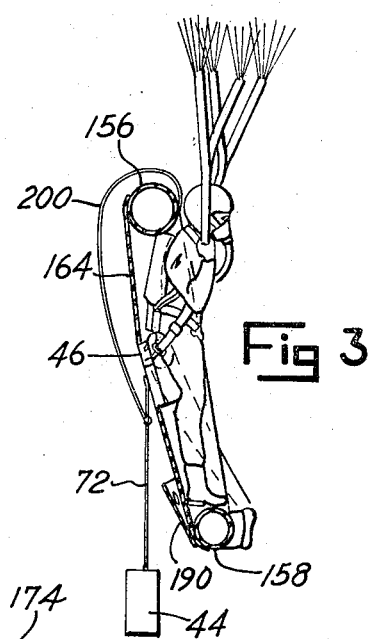
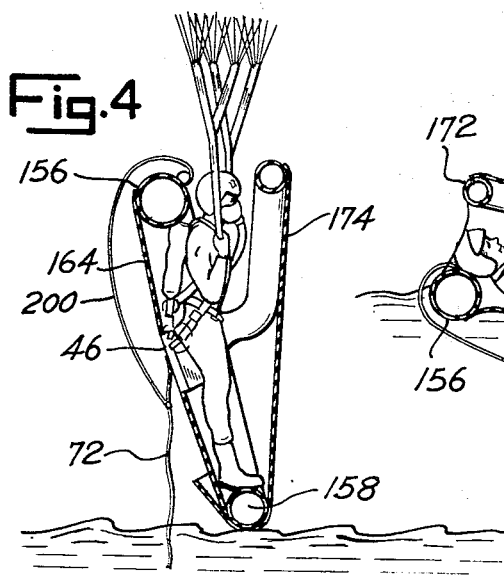
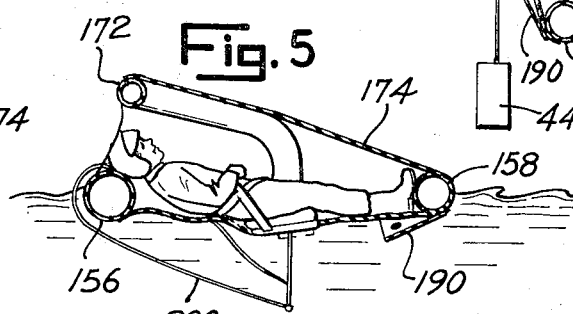
INVENTOR.
ROBERT L. CRAMER
BY
Gordon H. Cheney
AGENT

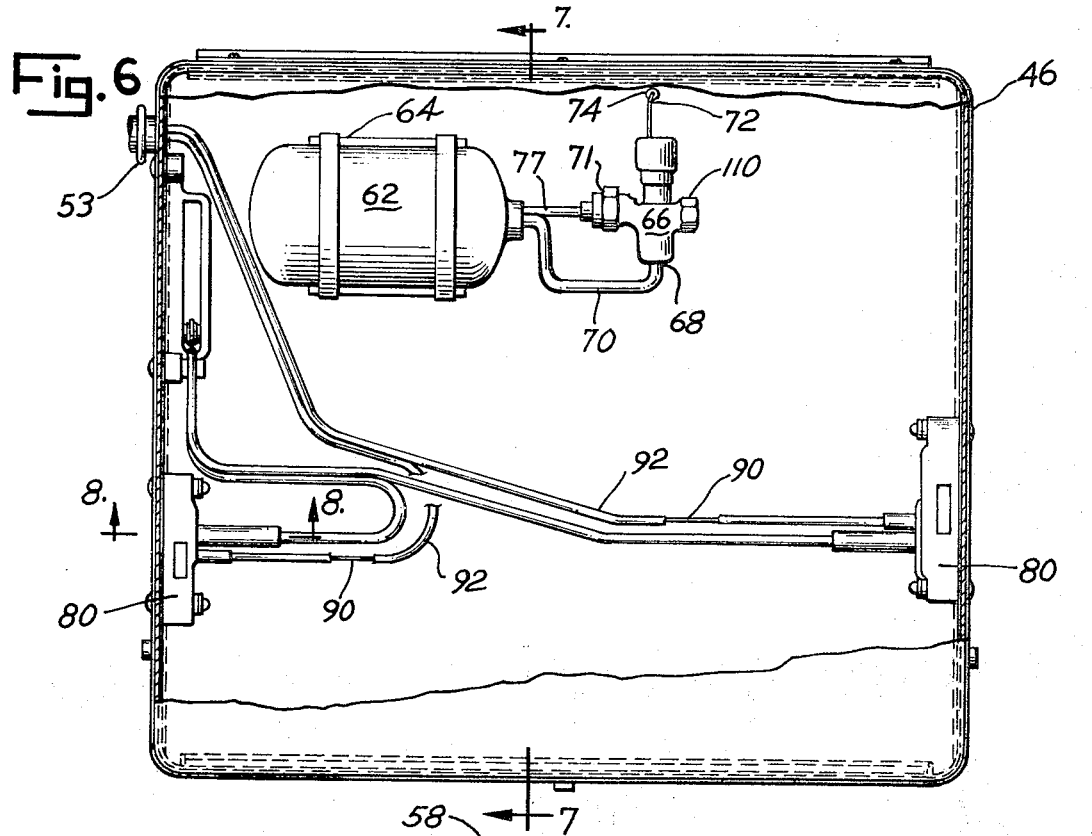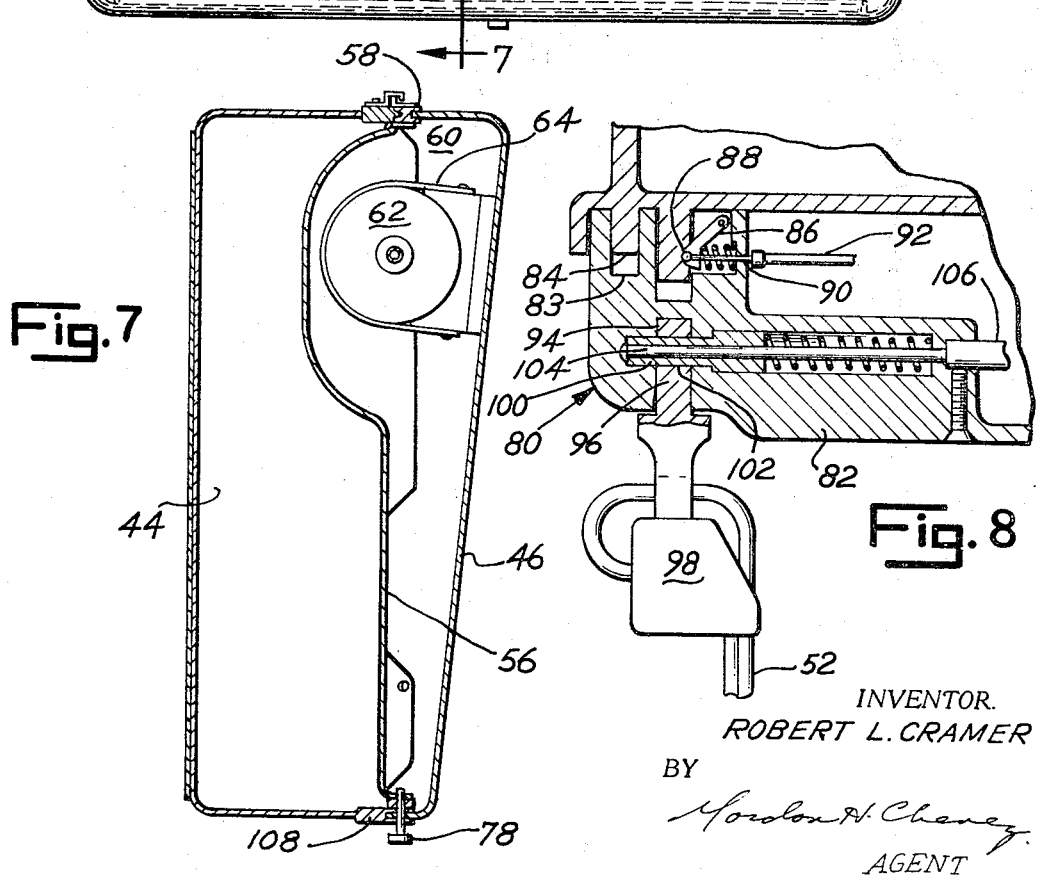

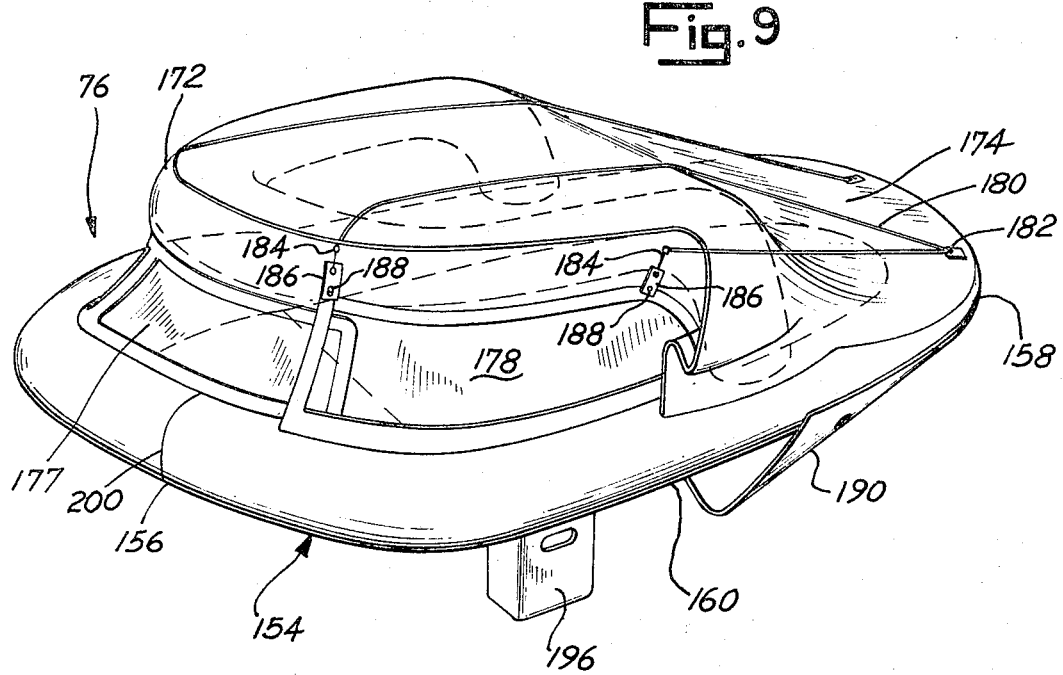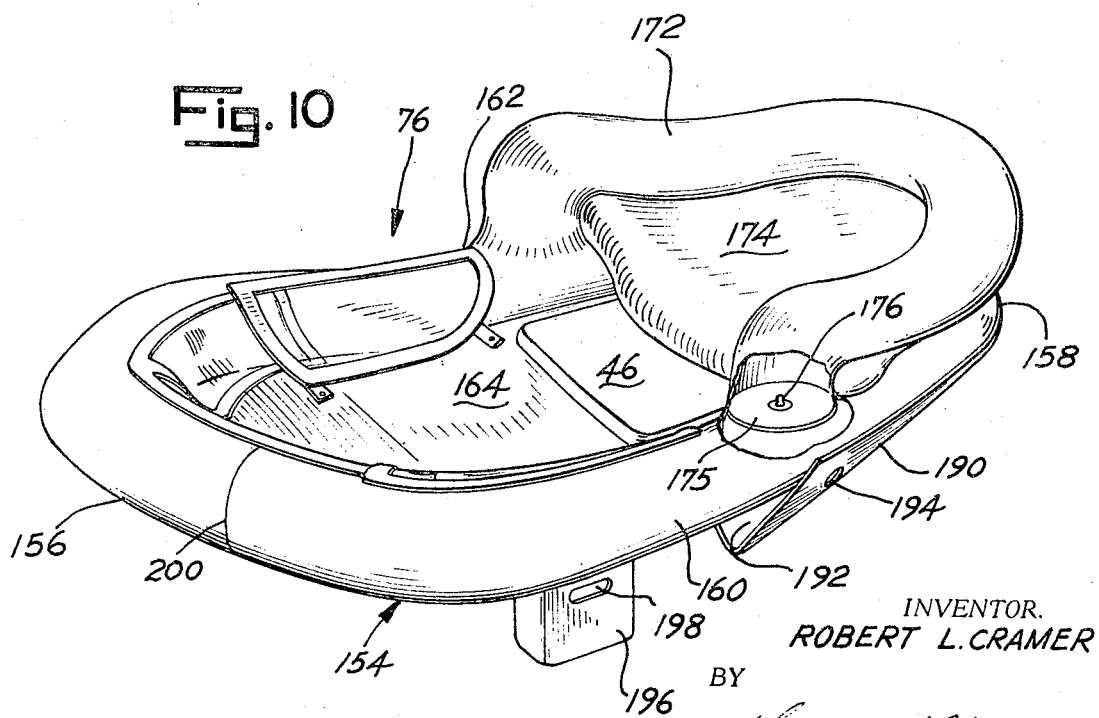

Patented Oct. 30, 1973

INVENTOR.
ROBERT L. CRAMER
BY
Gordon H. Chavez
AGENT

INFLATABLE LIFE RAFT

BACKGROUND OF THE INVENTION

The present invention relates to survival equipment and, in particular, a life raft for use by aircraft crew members. Survival equipment for aircraft use such as a life raft upon which a parachutist from a disabled aircraft over water must rely to survive unfavorable water and/or environmental weather conditions to which he may be exposed may take various forms as indicated by various prior art including U.S. Pat. No. 2,928,108 issued Mar. 15, 1960, U.S. Pat. No. 2,467,038 issued Apr. 12, 1949 and Pat. No. 3,107,370 issued Oct. 22, 1963. Such prior apparatus of which I am aware may not be entirely satisfactory for one or more reasons including undue weight and/or bulkiness, complexity and related unreliability of operation, limited protection against adverse water and weather conditions including entry into water via parachute, and discomfort experienced by the aircraft crew members wearing such survival equipment which normally is attached to the parachute harness so as to accompany the crew member upon bail out.

The present invention provides an inflatable lightweight life raft confined in an uninflated state in a pod of relatively small volume which is contoured to provide maximum comfort to an aircraft crew member wearing the same over extended periods of time. The life raft is compartmented to permit automatic pressurization by gas in a predetermined sequence during parachute descent such that the parachutist is adequately shifted against water exposure by a cabin-like portion integral with a water borne raft portion. The characteristics of applicant's life raft include reliable life raft inflation and protection to an injured parachutist who may be unconscious during descent into water.

It is an object of the present invention to provide compact integrated inflatable survival apparatus and reliable inflation apparatus for pressurizing the same with gas.

It is a further object of the present invention to provide a parachutist-worn inflatable life raft pressurized by gas to substantially enclose the parachutist prior to impact with water to thereby provide protection against water exposure and/or environmental weather conditions.

BRIEF DESCRIPTION OF THE DRAWINGS

FIG. 1 is a schematic representation of an aircraft crew member in normal seated position in an aircraft with survival equipment including the present invention attached to the crew member;

FIGS. 2, 3, 4 and 5 are schematic representations of applicant's inflatable life raft showing the life raft inflation sequence during a parachute descent from a disabled aircraft;

FIG. 6 represents the survival equipment container with the outer shell thereof partially removed to show the inflation mechanism for the life raft;

FIG. 7 is a cross-sectional view of the survival equipment container showing the lid portion thereof which contains applicant's inflatable life raft and inflation mechanism therefor;

FIG. 8 is a sectional view taken on line 8—8 of FIG. 6;

FIG. 9 is a pictorial representation of applicant's life raft in inflated form with the cabin portion therein in position;

FIG. 10 is a pictorial representation of applicant's life raft in inflated form with the cabin portion thereof folded back to uncover the raft;

DESCRIPTION OF THE PREFERRED EMBODIMENT

Figure 11:
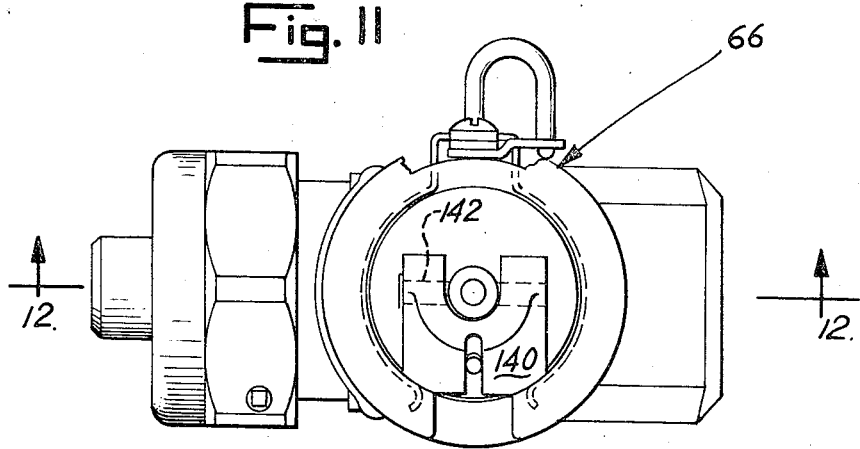
FIG. 11 is a cross-sectional view taken on line 11—11 of FIG. 6.

Referring to FIG. 1, numeral 40 designates conventional aircraft seat structure adapted to support an aircraft crew member and contoured to receive a two part container 42 having base and lid portions 44 and 46, respectively. The lid portion 46 may be provided with an inflatable spacer 48 integral therewith upon which the crew member is comfortably seated. A manually operated squeeze bulb 49 suitably vented to spacer 48 is provided to pressurize spacer 48 thereby adjusting the position of the crew member accordingly for optimum comfort. Conventional back pack parachute equipment including harness 50 is worn by the crew member. The harness 50 includes leg straps 52 suitably secured to lid portion 46 to thereby secure the same in position against the crew member as shown. A manually actuated release handle 53 suitably secured to lid portion 46 and readily accessible to the parachutist is connected to cause separation of base and lid portions 44 and 46 as will be described. A manually actuated release handle 54 attached to the lid portion 46 is provided for emergency release of the container 42 from the parachute harness 50 in the event that the survival equipment is not required as will be described.

Referring to FIGS. 6 and 7, the base portion 44 is adapted to provide a sealed chamber which contains conventional survival gear such as food, fresh water, medical supplies, etc., normally carried in addition to the inflatable raft.

The lid portion 46 is provided with a cover plate 56 having a rim portion 58 suitably recessed to receive lid portion 46 thereby defining a closed chamber 60. The chamber 60 is adapted to contain a suitable tank or container 62 of pressurized gas such as $CO_2$ which tank is anchored to lid portion 46 by a suitable support member 64. Valve mechanism generally indicated by 66 is anchored to support member 64 and provided with a gas inlet 68 coupled via a tube 70 to tank 62 and a gas outlet 71. The valve mechanism 66 is connected to and actuated by a flexible cable 72 leading through an opening 74 in lid portion 46 to base portion 44 as will be described. The chamber 60 further contains an inflatable raft generally indicated by 76 which is compacted in predetermined folded relationship within chamber 60. The gas outlet 71 is suitably coupled via a tube 77 to raft 76 and vents pressurized gas to the interior of raft 76 to inflate same as will be described. If desired, the gear contained in base portion 44 may be suitably stowed in the raft 76 rather than separately packaged in the manner shown.

The lid portion 46 may be assembled as a separate unit and latched to base portion 44. To that end, the raft 76 is evacuated to remove air from the interior thereof and expedite folding thereof to a minimum volume within chamber 60. The cover plate 56 is placed into position on lid portion 46 thereby compressing raft 76 to hold the same in folded portion. A plurality of retaining pins 78 suitably located in spaced-apart relationship extend through aligned openings in lid portion 46 and rim portion 58 to temporarily secure lid portion 46 and cover plate 56 in position. In the event survival gear such as food, water, etc., is stowed in the raft 76, it will be understood that the cover plate 56 is not required and the entire volume within base and lid portions 44 and 46 can be utilized for packing raft 76.

The lid portion 46 is provided with two identical latching devices 80, only one of which is shown and described, on opposite sides thereof. The latching device 80 includes a casing member 82 fixedly secured to lid portion 46 and provided with a slot 83. The slot 83 slidably receives a mating projection 84 integral with or otherwise fixedly secured to base portion 44. A spring loaded latch 86 pivotally secured to casing member 83 is urged into a recess 88 formed in projection 84 to thereby prevent separation of casing member 83 and projection 84 when assembled.

A cable 90 attached to each latch 86 extends through an associated conduit 92 and is secured to release handle 53.

The casing member 82 includes a second slot 94 which slidably receives a mating projection 96 formed on a buckle 98 attached to a leg strap 52. A spring loaded latch pin 100 slidably carried by casing member 82 extends through an opening 102 in projection 96 to prevent separation of projection 96 and casing member 82. The latch pin 100 is suitably secured to a cable 104 slidably contained by a conduit 106 and attached at the opposite end to the manually actuated release handle 54. The second latching device 80 likewise is provided with an actuating cable 104 slidably carried in an associated conduit 106 and actuated by release handle 54.

The base portion 44 is provided with a rim portion 108 adapted to mate with the rim 58 of lid portion 46. With the lid portion 46 and base portion 44 assembled as shown in FIG. 7, the heretofore mentioned retaining pins 78 are removed from lid portion 46 to release the cover plate 56. The retaining pins 78 preferably are of suitable length to extend outwardly from lid portion 46 so as to interfere with the bucket of seat 40 when placed therein in the event the pins 78 have not been withdrawn.

Figure 12:
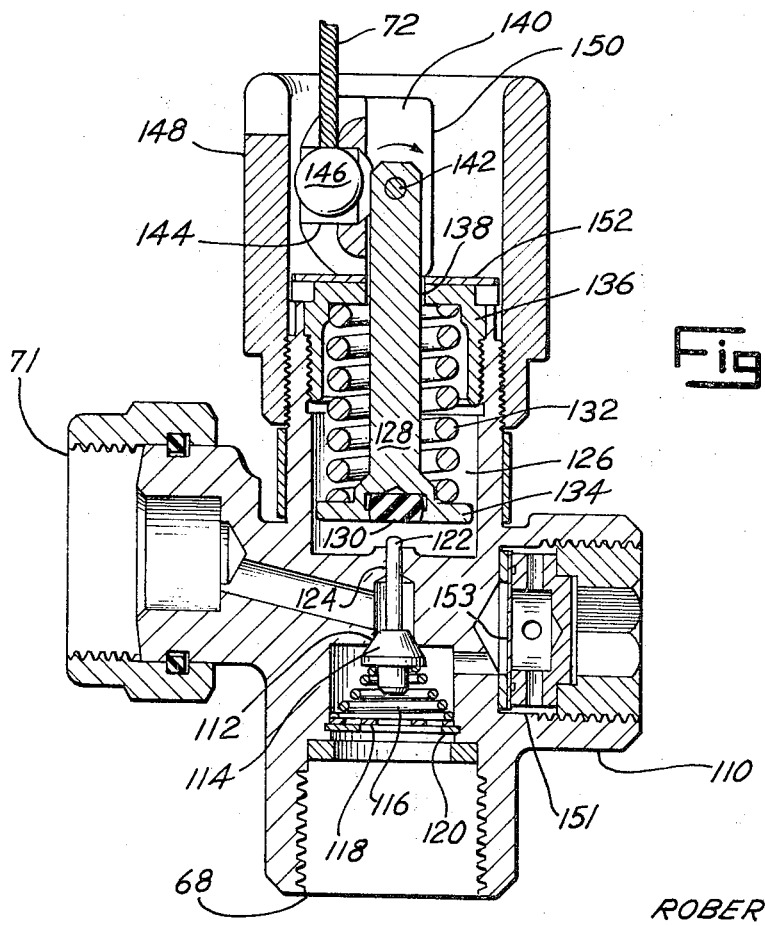
FIG. 12 is a sectional view taken along line 12—12 of FIG. 11.

Referring to FIGS. 11 and 12, the valve mechanism 66 is defined by a casing 110 having a flow orifice 112 in series flow relationship with inlet 68 and outlet 71. A valve 114 is biased to a seated position against orifice 112 by a compression spring 116 interposed between valve 114 and a perforated retaining plate 118 which bears against a snap ring 120 suitably secured to casing 110. A stem 122 integral with valve 114 slidably extends through an opening 124 into a chamber 126. A plunger 128 is provided with a resilient pad 130 centrally located in the end portion thereof and adapted to engage step 122 under the influence of a compression spring 132 interposed between a spring seat 134 integral with plunger 128 and a fixed spring retaining cup 136 threadedly engaged with casing 110. The plunger 128 slidably extends through an opening 138 in retaining cup 136 and is attached to a two-position cam member 140 pivotally secured thereto via a pin 142. The cam member 140 has a first position as shown in FIG. 11 wherein it abuts fixed retaining cup 136 to withdraw plunger 128 against the influence of spring 132 thereby establishing a spaced-apart relationship with stem 122. A recess 144 in cam member 140 is adapted to loosely receive a ball 146 integral with flexible cable 72 and retained in recess 144 by a tubular shield 148 threadedly engaged with casing 110. A suitable force applied to cable 72 results in pivotal movement of cam member 140 which rotates through 90° to its second position wherein flat 150 thereof abuts retaining cup 136 under the influence of spring 132 which forces plunger 128 against stem 122 causing valve 114 to unseat. With valve 114 unseated, pressurized $CO_2$ is vented through orifice 112 to outlet 71. The ball 146 is disengaged from recess 144 as cam member 140 rotates therebh releasing cable 72. An overpressure drain port 151 is provided with a conventional pressure responsive rupture disc 153 suitably secured therein and adapted to rupture in response to a predetermined pressure upstream from orifice 112.

A plate 152 suitably coated on one surface thereof with antifriction material may be interposed between cam member 140 and retaining cup 136 to reduce resistance to sliding movement therebetween.

The inflatable raft 76 is formed from any suitable relatively light-weight material having satisfactory strength over a fairly wide range of temperatures and resistance to deterioration as, for example, conventional nylon neoprene twill material. Referring to FIGS. 9 and 10, the raft 76 is provided with a flotation tube portion 154 having a head end 156 and a foot end 158 connected by side portions 160 and 162 which together form a generally oval-shaped structure wherein the head end 156 is angled upward at approximately 25° relative to the side portions 160 and 162. A floor panel 164 of flexible material similar to that of tube portion 154 is secured at its outermost edge portion to tube portion 154 by any suitable means such as sewing and/or cement providing a sealed connection. The floor panel 164 is preferably made of suitable double wall construction and provided with a tube having a conventional check valve, not shown, therein by means of which the floor panel 164 may be orally inflated to provide insulation against the water.

The head end 156 beam is greater than the beam across the foot end 158 and tapers inwardly to form a generally pointed bow in typical boat hull fashion for water stability purposes.

The lid portion 46 is fixedly secured to the floor panel 164 by any suitable means providing a fluid seal and therefore is an integral part of panel 164.

A cabin arch tube portion 172 is attached at opposite ends to side portions 160 and 162, respectively, and secured thereto by any suitable means such as sewing and tape or cement providing a fluid seal. The tube portion 172 is preformed and in the deflated state is folded in overlapping relationship to side portions 160 and 162 as well as foot end 158. When inflated, the tube portion 172 swings up and away from the foot end 158 to a position substantially parallel to and in spaced-apart relationship to head end 156. A roof panel 174 fixedly secured to tube portion 172, side portions 160 and 162 and foot end 158 by any suitable means such as sewing and cement providing a fluid seal is adapted to be stretched over the bottom portion including floor panel 164.

The cabin arch tube portion 172 is separated interiorly from flotation tube portion 154 by walls 175, only one of which is shown, suitably secured to tube portion 172 by any suitable means providing a fluid seal. The walls 175 are each provided with a conventional check valve 176 which opens in response to a predetermined pressure differential thereacross to admit pressurized gas from flotation tube portion 154 to arch tube portion 172. It has been found that fixed area flow restrictions or orifices, not shown, may be substituted for check valves 176 providing the cabin tube portion 172 is held against foot end 158 by suitable restraining means such as conventional velcro tape until pressure has been built up in flotation tube portion 154.

A window partition 177 formed of suitable conventional transparent flexible material trimmed with nylon neoprene twill is fixedly secured at its lower edge to the head end 156 tube by any suitable means such as sewing and tape or cement providing a fluid seal. Normally, the window partition 177 does not bridge the opening between the flotation tube portion 154 and tube portion 172 and provides an opening through which the parachute risers extend during inflation of tube portions 154 and 172, as shown in FIG. 4. However, after the raft 76 is inflated and water borne, the parachute harness worn by the parachutist may be released permitting the harness and attached risers to be withdrawn by the parachute. The window partition 177 may be lifted and secured at the top edge thereof to tube portions 172 by any suitable fastening means such as snaps, zipper or well known velcro tape, not shown, fastening means such as snaps, zipper or well known velcro tape, not shown, to bridge the opening between tube portions 154 and 172.

Side window partitions 178 formed of transparent flexible material and suitably trimmed are likewise fixedly secured at the bottom edge thereof to tube portion 154. Like window partition 177, the window partitions 178 may be raised to bridge the opening between tube portions 154 and 172. A cord 180 passes through an anchor fitting 182 fixedly secured to foot end 158 and extends therefrom in V-shape. Opposite ends of cord 180 pass through associated spaced-apart slip fittings 184 fixedly secured to tube portion 172 and are each provided with a snap fitting 186 fixedly secured thereto. The snap fittings 186 are engageable with mating fittings 188 fixedly secured to associated window partitions 178 to thereby draw the same upwardly and bridge the opening between tube portions 154 and 172.

If desired, the raft occupant may uncover the raft by releasing the window partitions 177 and 178 from the tube portion 172 and folding the tube portion 172 back against front end 158. The cord 180 may be pulled through anchor fitting 182 and suitably secured to hold the tube portions 172 in the folded position.

For ballast purposes, a water scoop is provided at the foot end 158 by means of a panel 190 suitably secured along one edge thereof to the tube portion 172 and depending therefrom to form a water inlet 192. One or more openings 194 formed in panel 190 permit flow out of scoop 192.

A sea anchor attached to each side portion 160 and 162 depends therefrom and is defined by a bag-like enclosure 196 suitably secured to tube portion 172. An inlet 198 in the upper portion of enclosure 196 permits water flow into the same when immersed.

Referring to FIGS. 1 through 5, it will be assumed that the crew member has been suitably separated from a disabled aircraft as, for example, by conventional seat ejection apparatus, not shown, following which automatic separation of the seat from the crew member and subsequent release of the parachute occurs in the usual manner.

As the parachutist descends the release handle 53 is manually pulled causing the cables 90 to retract latches 86 from the respective recesses 88 thereby allowing base portion 44 to drop free from lid portion 46 and exert a pull on flexible cable 72 which, in turn, rotates cam member 140 against plate 152 causing flat 150 to engage plate 152. The plunger 128 is urged by spring 132 into engagement with stem 122 thereby driving valve 114 open which, in turn, communicates inlet 68 with outlet 71 thereby venting pressurized gas to tube portion 154. The base portion 44 is suspended from lid portion 46 via cable 72 by virtue of ball 146 which pulls free from recess 144 but cannot pass through opening 74. In the event survival gear such as food, water, etc., is packed into the raft 76 as mentioned heretofore, the cable 72 may be permitted to fall free from lid portion 46 thereby discarding base portion 44.

The cover plate 56 falls free from lid portion 46 thereby exposing raft 76. The tube portion 154 inflates in response to the pressurized gas directed thereto causing the foot end 158 to expand downwardly and head end 156 to expand upwardly to encase the lower portion including the feet of the parachutist. Upon reaching a predetermined inflation pressure in flotation tube portion 154, the check valves 176 open to admit pressurized gas to the cabin arch tube portion 172 which inflates causing the same to swing from foot end 158 toward head end 156 thereby swinging roof panel 174 in position over the parachutist as shown in FIG. 4. It will be recognized that the above-described inflation of the raft 76 occurs in a relatively short time to ensure encapsulation of the parachutist before entry into the water. Automatic separation of base and lid portions 44 and 46 may be desired in which case the manual release handle 53 may be deleted and replaced by conventional apparatus, not shown, responsive to at least one reliable condition which varies as a function of altitude such as atmospheric pressure or alternately, providing timing mechanism for causing separation after a predetermined time interval.

As the parachutist approaches the water, the raft 76 will normally trail the parachute as a result of wind drift effect such that upon impact of the raft 76 with the water, the parachute harness may be released by the parachutist whereupon the risers and harness will be withdrawn through the opening between head end 156 and the cabin arch tube portion 172. The raft occupant may then raise window partitions 177 and 178 and secure the same to tube portion 172 thereby enclosing the head end of the raft 76. The base portion 44 may be retrieved by the raft occupant by means of a cord 200 which passes over tube portion 154 and is attached to cable 72. Since the weight of base portion 44 is exerted on the lid portion 46 which is centrally located in the raft floor panel 164, relatively little effort is required to pull cord 200 to draw cable 72 within reaching distance and recover the base portion 44.

In the event that the aircraft crew member does not require the survival equipment including the raft when leaving the aircraft, the handle 54 may be manually pulled to retract cables 104 and 105 and thus latch pins 100 from projections 96 on buckles 98. The projections 96 are then free to pull out of associated slots 94 permitting the crew member to stand free of the survival equipment equipment including base portion 44 and attached lid portion 46.

Test results of raft 76 upon impact with water have indicated that the raft provides adequate protection under unusual circumstances such as touchdown with raft 76 in an inverted position or on a side. In the inverted position of raft 76, the cabin arch tube portion 172 and attached panel 174 tend to isolate the raft occupant from water exposure as well as provide flotation. Since the occupant is located at the approximate center of gravity of the raft 76, the floating raft may be quickly and easily righted as a result of twisting body motion by the occupant to thereby roll the raft to a righted position.

I claim:

1. Protective means for automatically enclosing a crew member wearing a parachute during a descent with a covering to provide a shield against adverse conditions in an environment, said protective means comprising:

housing means attached to said crew member having a lid portion and a base portion;

release means for separating said lid portion from said base portion during said descent;

raft means located in said lid portion of the housing having sequentially connected flotation tube and cabin tube portions to provide a framework for a floor panel and a roof panel, said flotation tube portion having a foot end and a head end separated by spaced apart side portions, said floor panel having a top wall and a bottom wall which define an air tight volume, said cabin tube portion having opposite ends connected to said side portions to create an arch-like support by moving from said foot end toward said head end in response to an inflation gas to completely enclose said crew member during descent, said flotation and cabin tube portions upon inflation have a spaced relationship to provide an opening through which the parachute extends during descent;

check valve means located in said top wall of the floor panel for orally inflating said air tight volume to provide insulation against said adverse conditions in the environment;

anchor means secured to said flotation tube for maintaining said raft means in a stable position in said environment;

water scoop means secured to and depending from said float end of the flotation tube to provide ballast for the raft means;

a flexible partition secured to said flotation tube and said cabin tube for sealing said opening through which the parachute extends upon separation of the parachute and the crew member to provide a water tight compartment;

storage means connected to said flotation tube containing a source of pressurized gas; and valve means connected to said storage means and responsive to movement of said base portion of the housing means upon separation from the lid portion for allowing said pressurized gas to sequentially inflate said flotation tube and said cabin tube during descent to develop said shield.

2. The protective means, as recited in claim 1 wherein:

said cabin tube portion, said flexible partition, and said flotation tube isolate said crew member from water in said environment.

* * * * *